United States Patent [19]

Reuter

[11] Patent Number: 5,205,517
[45] Date of Patent: Apr. 27, 1993

[54] LARGE PARACHUTE WITH MEANS TO POSITIVELY EXPAND AND CIRCULARIZE THE INLET AREA TO FACILITATE DEPLOYMENT THEREOF

[75] Inventor: James D. Reuter, Manchester, Conn.

[73] Assignee: Pioneer Aerospace Corporation, South Winsdor, Conn.

[21] Appl. No.: 936,166

[22] Filed: Aug. 27, 1992

[51] Int. Cl.$^5$ .................... B64D 17/08; B64D 17/20; B64D 17/34
[52] U.S. Cl. .................................. 244/147; 244/145; 244/152
[58] Field of Search ............... 244/142, 145, 147, 149, 244/150, 152, 137.3

[56] References Cited

U.S. PATENT DOCUMENTS

| | | | |
|---|---|---|---|
| 1,802,325 | 4/1931 | Broadwick | 244/142 |
| 2,358,417 | 9/1944 | Quilter et al. | 244/142 |
| 2,399,100 | 4/1946 | Carr | 244/142 |
| 2,978,212 | 4/1961 | Istel et al. | 244/148 |
| 2,995,323 | 8/1961 | Dann | 244/150 |
| 3,014,022 | 6/1962 | Sepp, Jr. | 244/152 |
| 3,047,261 | 7/1962 | Bockelmann | 244/150 |
| 3,055,621 | 9/1962 | Martin | 244/142 |
| 3,117,753 | 1/1964 | Ewing | 244/152 |
| 3,278,143 | 10/1966 | Engel, Jr. | 244/150 |
| 3,690,604 | 9/1972 | Guilfoyle | 244/148 |
| 3,795,376 | 3/1974 | Stevenson et al. | 244/145 |
| 3,940,095 | 2/1976 | Asciutto | 244/148 |
| 4,058,276 | 11/1977 | Brown | 244/152 |
| 4,087,063 | 5/1978 | Caffey | 244/148 |
| 4,117,994 | 10/1978 | Webb | 244/152 |
| 4,169,568 | 10/1979 | Drew et al. | 244/148 |
| 4,524,930 | 6/1985 | Lindgren et al. | 244/152 |
| 4,623,109 | 11/1986 | Sadeck | 244/152 |
| 4,834,323 | 5/1989 | Reuter | 244/145 |
| 4,923,150 | 5/1990 | Calkins et al. | 244/151 B |
| 4,927,099 | 5/1990 | Emerson et al. | 244/152 |
| 4,955,564 | 9/1990 | Reuter | |

*Primary Examiner*—Joseph F. Peters, Jr.
*Assistant Examiner*—Virna L. Ansley
*Attorney, Agent, or Firm*—Sperry, Zoda & Kane

[57] ABSTRACT

A large parachute having an inlet control parachute operable to positively expand the inlet area of a large parachute detachably secured thereto to facilitate deployment of the large parachute including a main canopy which is reefed to the outer portion of the inlet control parachute. The inlet control parachute includes an inlet control canopy with an upper vent and a plurality of longitudinally extending inlet control gore panels which are attached with respect to one another longitudinally therealong and define an inlet control skirt along the lowermost edge thereof. The inlet control parachute is designed to expand in a generally circular form and thereby positively expand and circularize the inlet area of the large parachute to minimize folding and uneven distribution of the canopy of the large parachute during deployment thereof. Once the main inlet area of the main parachute is expanded and circularized a gore panel release device is operative to dismember the gore panel attachment device thereby detaching the individual inlet control gore panels which form the inlet control parachute. As such, the canopy of the inlet control parachute will lose its integrity and the reefing of the skirt of the main parachute will be terminated allowing the main parachute to fully deploy in a rapid and yet controlled manner.

20 Claims, 5 Drawing Sheets

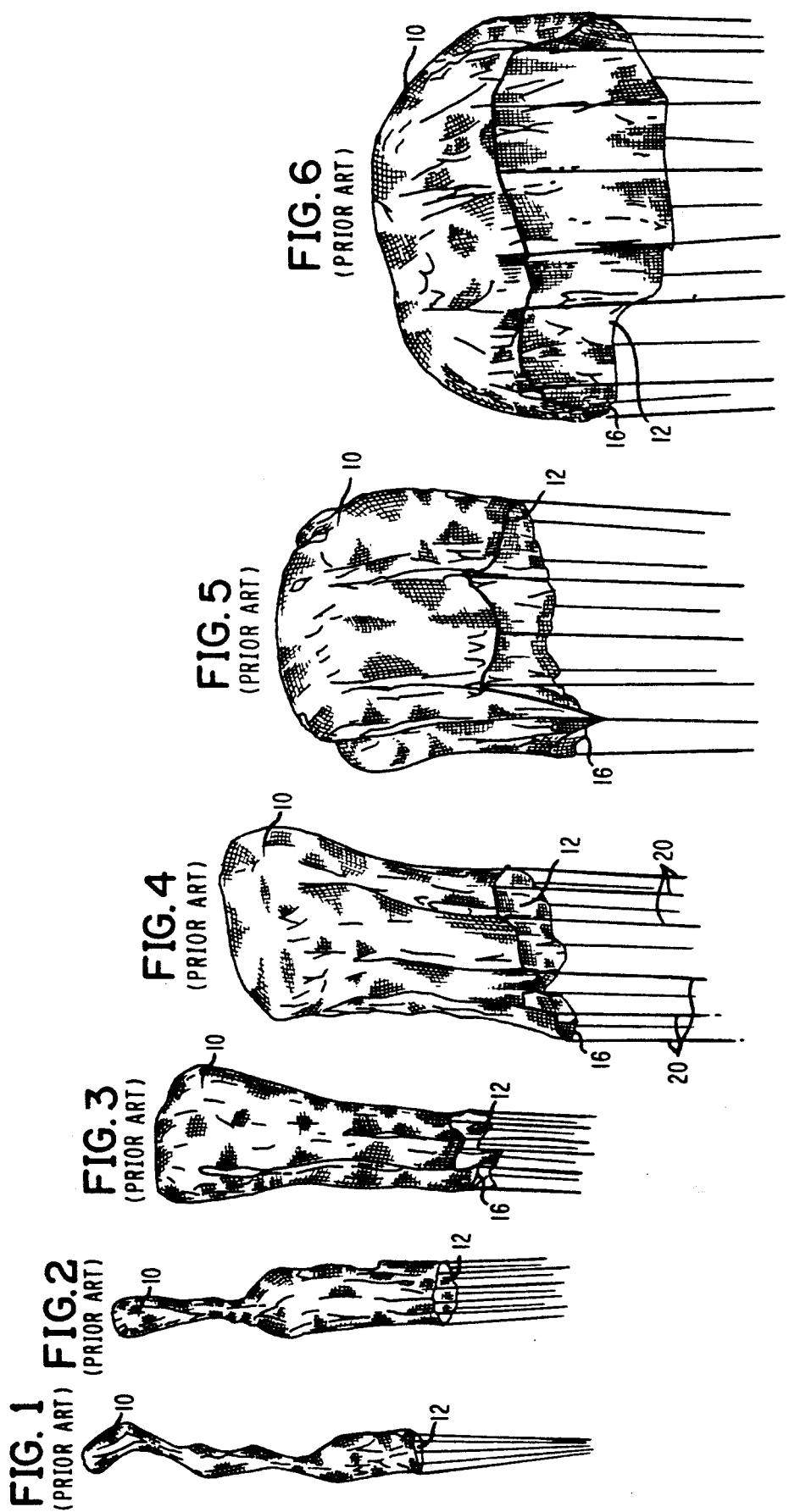

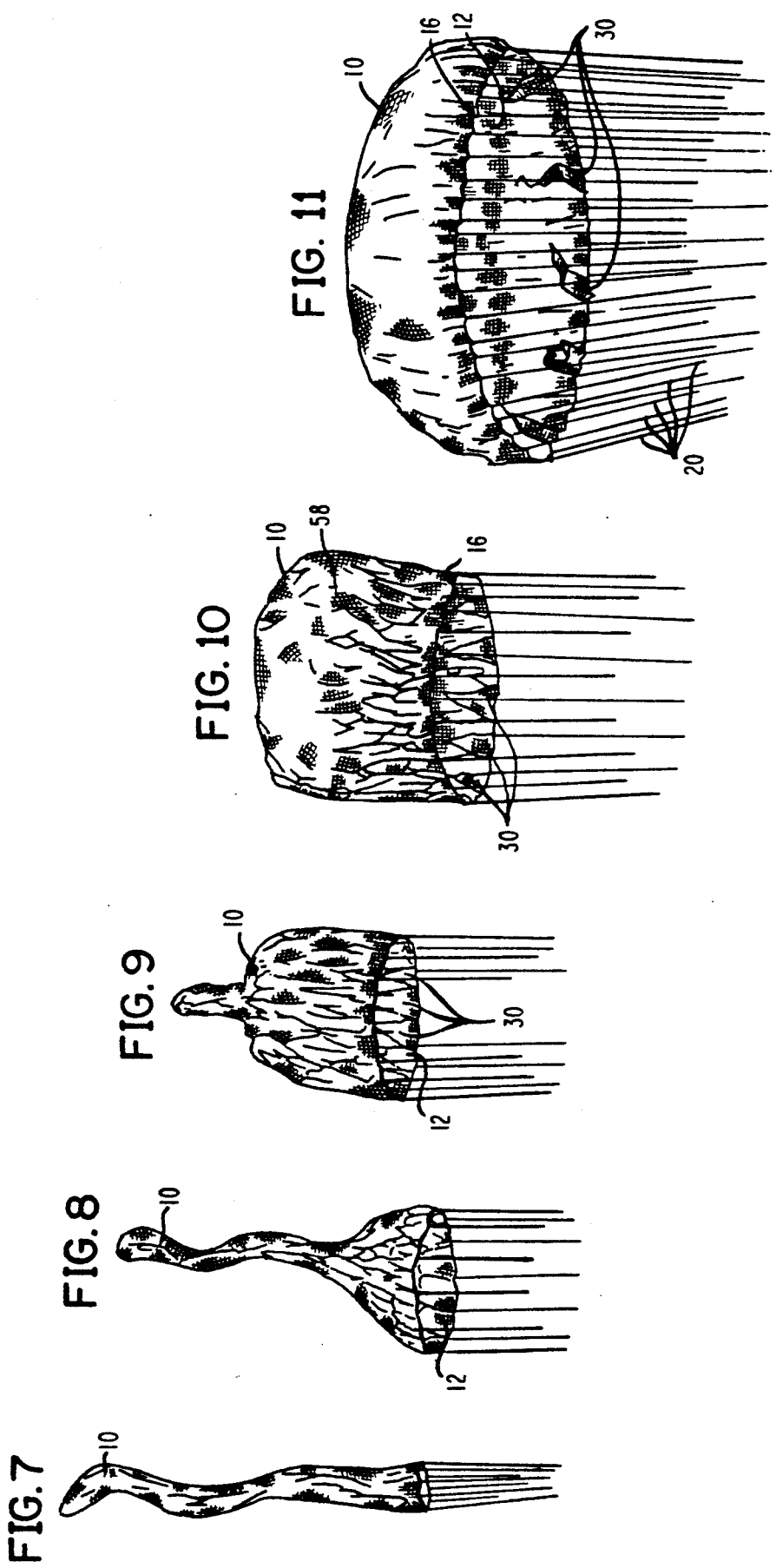

LARGE PARACHUTE WITH MEANS TO POSITIVELY EXPAND AND CIRCULARIZE THE INLET AREA TO FACILITATE DEPLOYMENT THEREOF

BACKGROUND OF THE INVENTION

1. Field Of The Invention

The present invention deals with the field of devices for facilitating deployment of generally large parachutes utilized most usually for low altitude delivery of heavy cargo which is limited by the length of time required to inflate the these large parachutes to the fully opened state. Without an inflation control means such large parachutes often deploy in a relatively random process but can consume ten or more seconds which is often unacceptable in certain environments.

2. Description of the Prior Art

Designs utilized to facilitate deployment of large parachutes by in some manner controlling the deployment aspects thereof have been covered by numerous patents such as U.S. Pat. No. 2,358,417 patented in Sep. 19, 1944 to J. Quilter et al on a Parachute; U.S. Pat. No. 2,399,100 patented Apr. 23, 1946 to U. Carr on a Low Altitude Parachute; U.S. Pat. No. 2,978,212 patented Apr. 4, 1961 to J. Istel et al on a Parachute And Attached Sleeve; U.S. Pat. No. 2,995,323 patented Aug. 8, 1961 to C. Dann on a Device For Controlling The Effective Reefing And Dereefing Of A Parachute Canopy; U.S. Pat. No. 3,047,261 patented Jul. 31, 1962 to V. Bockelmann on a Parachute Disreefing Device; U.S. Pat. No. 3,055,621 patented Sep. 25, 1962 to J. Martin on a Parachute Apparatus; U.S. Pat. No. 3,278,143 patented Oct. 11, 1966 to H. Engel, Jr. on a Parachute Canopy Reefing At Panel Centerlines; U.S. Pat. No. 3,690,604 patented Sep. 12, 1972 to L. Guilfoyle on Parachute Stowage And Deployment; U.S. Pat. No. 3,940,095 patented Feb. 24, 1976 to H. Asciutto on a Parachute Assembly; U.S. Pat. No. 4,058,276 patented Nov. 15, 1977 to H. Brown on a Pilot Chute Crown Line Attachment System; U.S. Pat. No. 4,087,063 patented May 2, 1978 to L. Caffey on a Parachute Suspension Line Stoware Device; U.S. Pat. No. 4,169,568 patented Oct. 2, 1979 to G. Drew et al on a Hermetically Sealed Parachute Container; U.S. Pat. No. 4,524,930 patented Jun. 25, 1985 to M. Lindgren et al on an Inflation-Controlled Parachute; U.S. Pat. No. 4,623,109 patented Nov. 18, 1986 to J. Sadeck on a Lowe Altitude Parachute System; U.S. Pat. No. 4,923,150 patented May 8, 1990 to R. Calkins et al on a Parachute Spring Ring Release and U.S. Pat. No. 4,927,099 patented May 22, 1990 to R. Emerson et al on an Aerodynamic Controllably Vented Pressure Modulating Drogue.

SUMMARY OF THE INVENTION

The present invention provides a large parachute having a specific means for positively expanding the inlet area thereof to facilitate deployment. The main parachute can conventionally include a main canopy having a plurality of main gore panels joined together to form the main canopy. The individual gore panels are preferably of a material having a porosity of between 80 and 120 cubic feet of air per square foot of material per minute. A main skirt will be defined along the lower portion of the main canopy. This main skirt will preferably define a main inlet area adapted to receive the incoming air to aid in the deployment of the main parachute. A main reefing attachment device such as a plurality of main reefing rings may be attached to the main skirt of the main parachute to facilitate reefing thereof. A plurality of main suspension lines some of which may preferably be of a Kevlar material may be attached with respect to the main skirt and the main canopy. An inlet control reefing means is attachable with respect to the main reefing rings to control deployment of the main canopy.

The inlet control parachute of the present invention is designed for positively expanding and approximately circularizing of the inlet area of the main parachute in such a manner as to facilitate full deployment thereof. The inlet control parachute preferably includes an inlet control canopy defining an upper vent therein. The inlet control canopy further includes a plurality of inlet control gore panels which extend vertically and are detachably joined with respect to one another to form the inlet control canopy and also to define the upper vent approximately at the apex of the inlet control canopy. The inlet control gore panels may preferably include a lacing loop configuration to facilitate detachable attachment therebetween. Alternatively the inlet control gore panels can be interconnected by way of the conventional lacing line extending through grommets fixedly secured to the individual inlet control gore panels. Preferably the material of the inlet control gore panels has a porosity of between 5 and 10 cubic feet of air per square foot of material per minute.

A gore panel attachment means such as a gore panel line may be positioned adjacent the inlet control gore panels and be attached with respect to the lacing loop configuration to detachably attach each of the inlet control gore panels with respect to another similarly configured inlet controlled gore panel positioned thereadjacent. In this manner the gore panels will be joined integrally with respect to one another in a detachable fashion to form the overall configuration of the inlet control canopy.

The inlet control canopy will define an inlet control skirt along the lowermost end thereof which is selectively attachable with respect to the inlet control reefing configuration to facilitate control of deployment of the main parachute. With the main parachute connected with respect to the inlet control reefing means and with respect to the inlet control skirt deployment of the main parachute will be delayed until the inlet control parachute is disreefed or dismembered.

A gore panel release means such as a line cutter may be operatively attached with respect to the gore panel line means. The gore panel release means is operative to sever the gore panel line responsive to activation thereof. This line cutting means is operative responsive to activation to release the inlet control reefing means and to release the inlet control gore panels from attachment with respect to one another. In this manner dismembering of the inlet control canopy will be facilitated thereby disreefing the large parachute and allowing full deployment thereof.

It is an object of the present invention to provide a large parachute with means to positively expand and circularize the inlet area to facilitate deployment thereof wherein low altitude delivery of heavy cargo is facilitated.

It is an object of the present invention to provide a large parachute with means to positively expand and circularize the inlet area to facilitate deployment thereof wherein delivery of loads is made possible where the length of time required to inflate the large parachute is fairly small.

It is an object of the present invention to provide a large parachute with means to positively expand and circularize the inlet area to facilitate deployment thereof wherein deployment of ten seconds or less is required for the main parachute.

It is an object of the present invention to provide a large parachute with means to positively expand and circularize the inlet area to facilitate deployment thereof wherein predictable and repeatable rapid deployment of the large parachute is required.

It is an object of the present invention to provide a large parachute with means to positively expand and circularize the inlet area to facilitate deployment thereof wherein the mouth or inlet area of a large cargo parachute is moved to an optimum shape by means of temporarily adjoined segments of a smaller parachute.

It is an object of the present invention to provide a large parachute with means to positively expand and circularize the inlet area to facilitate deployment thereof wherein usability with large parachutes as large as 100 foot diameter is made possible.

It is an object of the present invention to provide a large parachute with means to positively expand and circularize the inlet area to facilitate deployment thereof wherein pleating and folding of a large parachute during deployment is minimized.

It is an object of the present invention to provide a large parachute with means to positively expand and circularize the inlet area to facilitate deployment thereof wherein irregular shaping of a large parachute during deployment is minimized.

It is an object of the present invention to provide a large parachute with means to positively expand and circularize the inlet area to facilitate deployment thereof wherein the fabric of the canopy of the large parachute has the fabric thereof and the lines about the opening evenly distributed to prevent irregular openings thereof.

It is an object of the present invention to provide a large parachute with means to positively expand and circularize the inlet area to facilitate deployment thereof wherein additional costs above and beyond the normal large parachute normally used in such cargo delivery is minimal.

It is an object of the present invention to provide a large parachute with means to positively expand and circularize the inlet area to facilitate deployment thereof wherein re-use of virtually all portions of the large parachute and expanding and circularizing means is usually possible.

It is an object of the present invention to provide a large parachute with means to positively expand and circularize the inlet area to facilitate deployment thereof wherein efficiency and speed of operation is significantly enhanced.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIGS. 1 through 6 show prior art deployment of a large cargo parachute;

FIG. 7 shows the initial stage of deployment of an embodiment of the large parachute of the present invention having means to positively expand and circularize the inlet area to facilitate deployment thereof;

FIG. 8 is a view of the embodiment shown in FIG. 7 somewhat later in time therefrom;

FIG. 9 is an illustration of the embodiment shown in FIG. 8 somewhat later in time therefrom;

FIG. 10 is an illustration of the embodiment shown in FIG. 9 somewhat later in time therefrom;

FIG. 11 is an illustration of the embodiment shown in FIG. 10 somewhat later in time therefrom;

DETAILED DESCRIPTION OF THE PREFERRED EMBODIMENT

Figure 13:
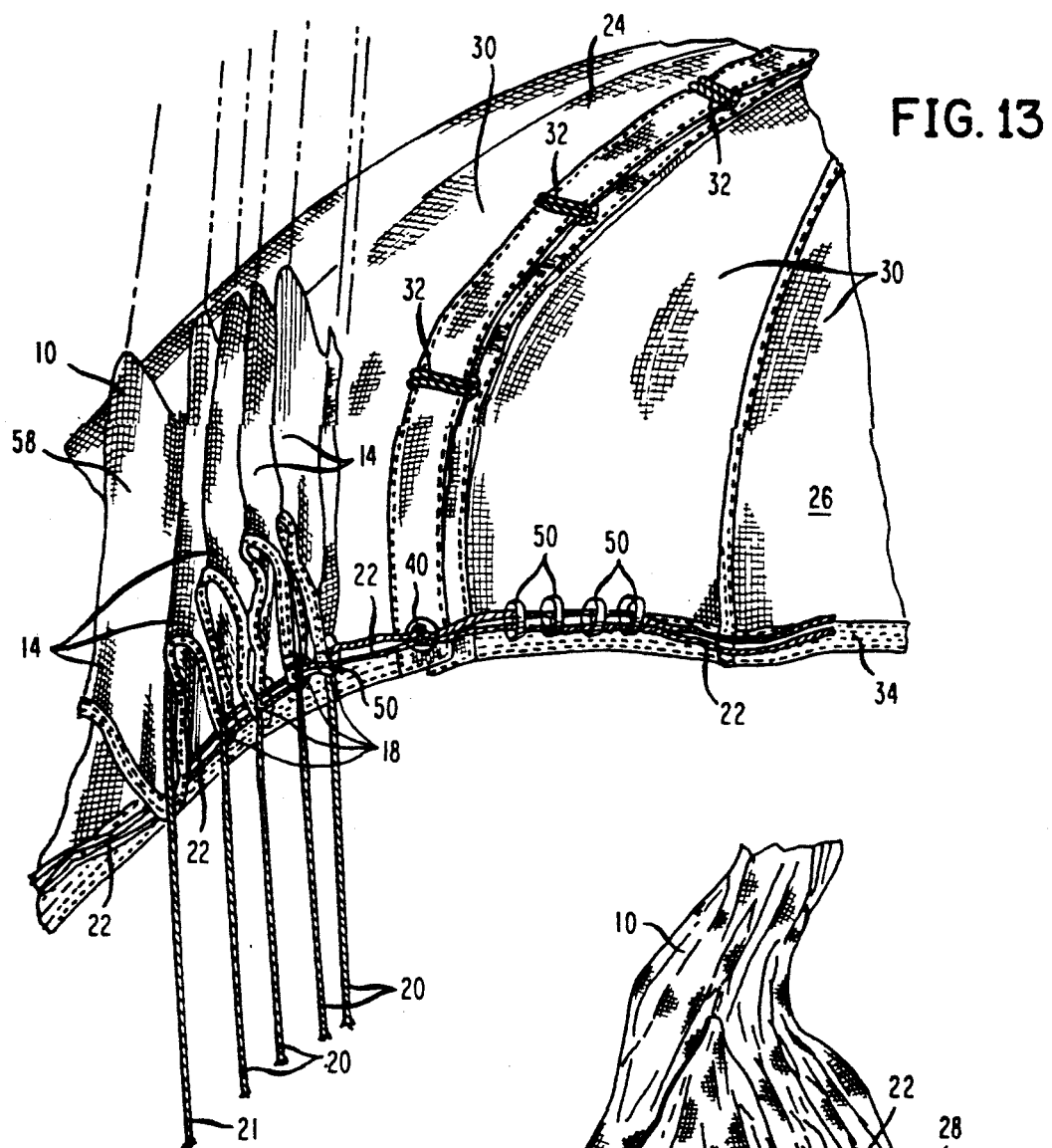
FIG. 13 is a close-up of an embodiment of the inlet control canopy skirt area showing reefing attachment of the main canopy to the inlet control canopy.

The present invention provides a new concept for controlling the expansion of a large main parachute 10 by controlling the inlet area 12 thereof by the use of integral gore panels which when temporarily laced together form a smaller parachute that inflates quickly. This small parachute is referred to as the inlet control parachute means 24. Inlet control parachute 24 forms a circular inlet area 12 for the large parachute 10 and distributes the fabric of the main parachute canopy 58.

The main parachute 10 is formed from a plurality of main gore panels 14 extending vertically from the main skirt means 16 at the lowermost portion thereof to the apex of parachute 10. A plurality of main suspension lines 20 extend downwardly from the main skirt 16 to facilitate securement of payloads thereto. One or more of these suspension lines can be formed of a Kevlar material 21.

Control of deployment of the large parachute 10 is achievable by the inclusion of a main reefing attachment means 18 which may take the form of main reefing rings 50. The reefing rings 50 which are attached to the main skirt 16 are also preferably movably attached with respect to an inlet control reefing means 22 which is normally secured to the outer area of the skirt 34 inlet control parachute 24. This attachment of the main reefing rings 50 with respect to the inlet control reefing means 22 is best shown in FIG. 13.

The inlet control parachute 24 includes an inlet control canopy 26 which defines an upper vent means 28 which will be generally circular in shape. The upper vent 28 will provide a path for the flow of a restricted amount of air passing therethrough into the main parachute 10 to initiate filling of the canopy 58 thereof to a limited extent even while the inlet control parachute 24 is still in full deployment.

The inlet control canopy 26 is preferably formed of a plurality of inlet control gore panels 30 which extend vertically from the inlet control skirt means 34 upwardly to the upper vent means 28. The individual inlet control gore panels 30 are attached with respect to each other laterally by a gore panel attachment means 32. One manner of attachment for the attachment means 32 would be the use of a gore panel line means 38 extending vertically along the vertically extending edges of adjacent gore panels 30 in such a manner as to pass through a plurality of grommets 40 which are attached with respect to the adjacent gore panels 30. A gore release line 44 which preferably can be a circular loop of line material is preferably positioned within the upper vent means 28 and is attached to the gore panel line means 38 extending upwardly along each seam between adjacent inlet control gore panels 30. With this configuration cutting of the gore release line 44 will allow release of the gore panel line means 38 associated with each seam between adjacent inlet control gore panels 30 to allow disreefing or dismemberment of the entire inlet control parachute 24. This dismemberment is generically referred to as the gore panel release means 36.

Figure 15:
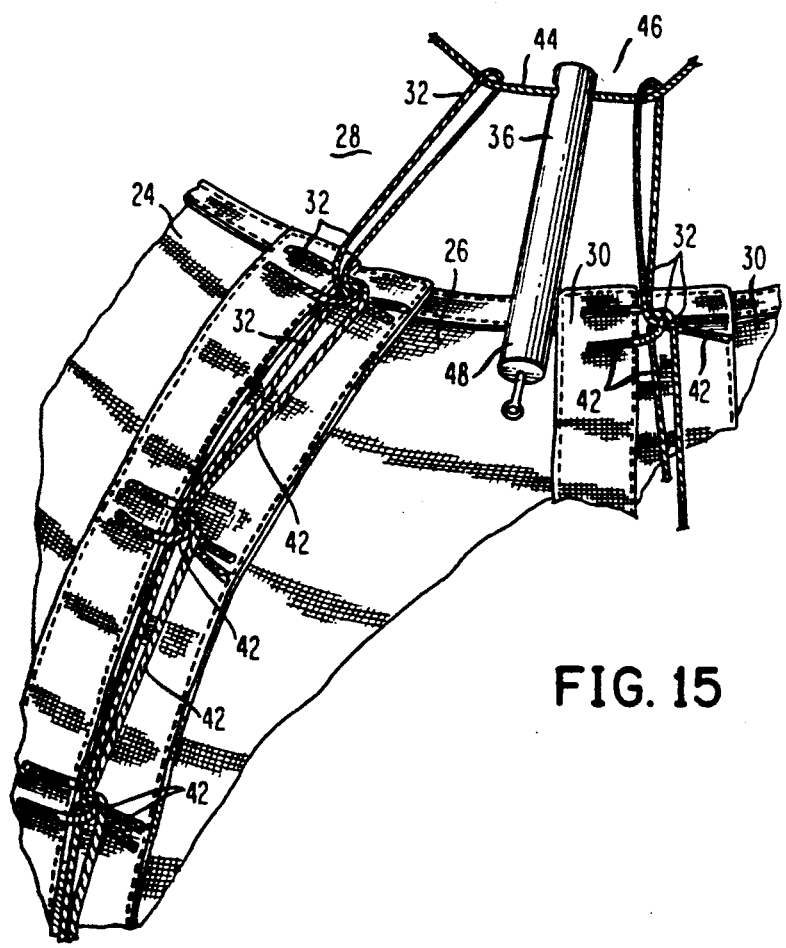
FIG. 15 is an alternative embodiment of the present invention showing use of the looped lacing means for interconnection of adjacent inlet control gore panels with respect to one another.

In an alternative configuration as shown best in FIG. 15, a plurality of lacing loops 42 can each be secured with respect to the laterally adjacent edges of the longitudinally extending inlet control gore panels 30 and be interlaced in such a manner that the uppermost last lace extends about the gore release line 44. With this configuration there is no need for utilizing of the grommets 40 because simple cutting of the gore release line 44 will initiate unraveling of the lacing loops 42 downwardly.

As can further be seen in FIG. 13 once the gore panel release means 36 is activated and the interconnection between adjacent inlet control gore panels 30 is initiated the adjacent gore panels will unravel with respect to one another downwardly until they become completely unraveled at the lowermost edge thereof. At that point the laterally extending inlet control reefing means 22 will also be released to allow full deployment of the main parachute 10 and maximum lateral expansion of the main inlet area 12 thereof.

Preferably the upper vent 28 will be positioned at the apex 46 of the inlet control parachute 24 with the circular gore release line 44 positioned therein. To facilitate cutting of the gore release line 40 preferably a line cutting means 48 operable by firing thereof is positioned extending about the gore release line 44. In this manner accurate control of cutting of the gore release line 44 by the line cutting means 48 will be achieved.

Figure 16:
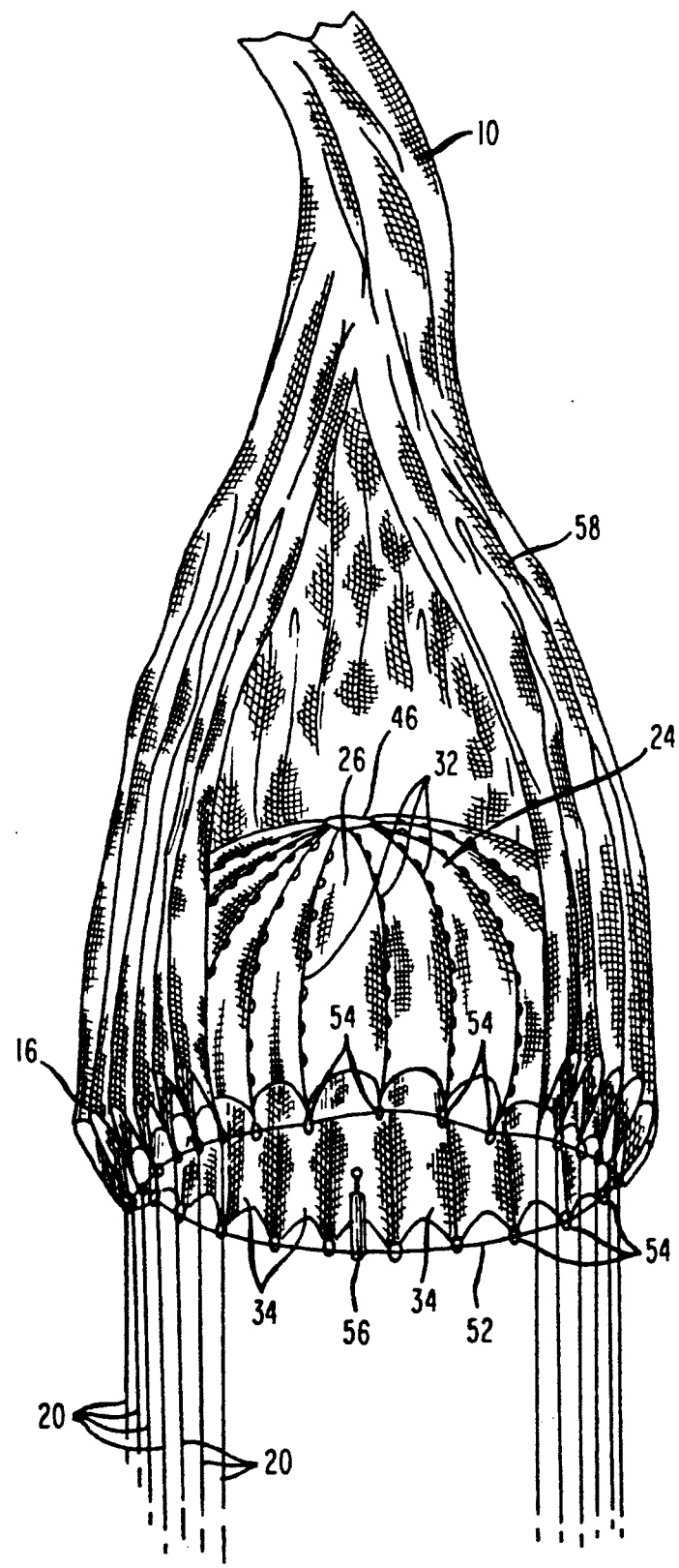
FIG. 16 is an alternative embodiment of the present invention showing a supplementary reefing means for use with the inlet control parachute to form two-stage deployment thereof.

In the alternative embodiment shown in FIG. 16 a supplementary inlet control reefing means is included as line 52. With this configuration a plurality of inlet control reefing rings 54 area attached with respect to the inlet control parachute 24 to restrict initial deployment thereof. A supplementary line cutting means 56 is positioned extending about the supplementary inlet control reefing line 52 in order to cut that line and allow full deployment of the inlet control parachute 24 and the canopy 26 thereof when desired.

In operation initially the parachute apparatus of the present invention is usable for the low altitude delivery of heavy cargo wherein the length of time to inflate is severely restricted. The present invention is particularly usable in those applications where full inflation of the main parachute is required in less than 10 seconds.

Figure 12:
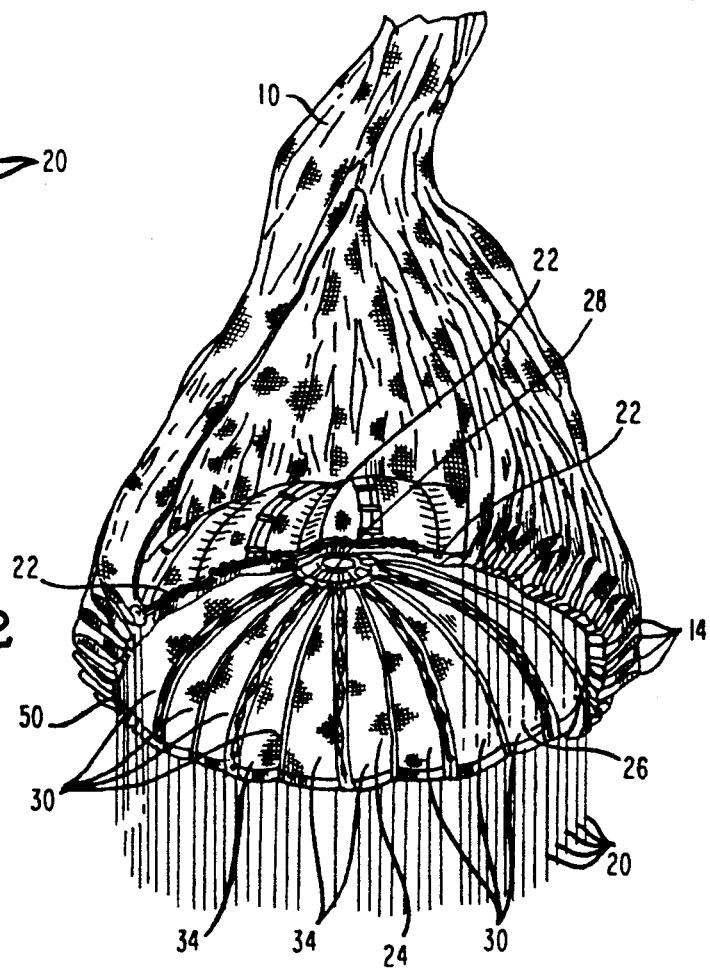
FIG. 12 is a close-up view of the embodiment shown in FIG. 8 illustrating an embodiment of the inlet control parachute in the fully deployed position.

With the configuration of the present invention the large cargo parachute assembly is stripped from its deployment bag and exposed to the airstream. When utilizing the supplementary inlet control reefing means 52 the parachute will initially inflate to the configuration shown in FIG. 16 which is the first stage of deployment of the inlet control parachute 24. After a predetermined time delay the supplementary line cutting means 56 will fire causing cutting of the supplementary inlet control reefing line 52 and allow full deployment of the inlet control parachute 24. The position during full deployment of the inlet control parachute 24 is best shown in FIGS. 12, 13 and 14.

Once the full deployment of the inlet control parachute 24 has been achieved it is possible at any time thereafter to initiate full inflation of the large parachute 10. This would be caused by firing of the line cutting means 48 positioned within the upper vent 28 of the inlet control parachute 24. The timing of the initiation of this full deployment of the large parachute 10 can be controlled as desired. It may be desirable to have additional time added after full deployment of the inlet control parachute 24 in order to allow some additional filling of the large parachute by the passing of air through the upper vent 28 defined in the inlet control canopy 26.

Once the main skirt 16 of the main canopy 58 has been positively expanded and circularized with the fabric of the canopy and lines distributed outwardly and evenly it is then possible to activate the line cutting means 48 which operates as the gore panel release means 36.

Figure 14:
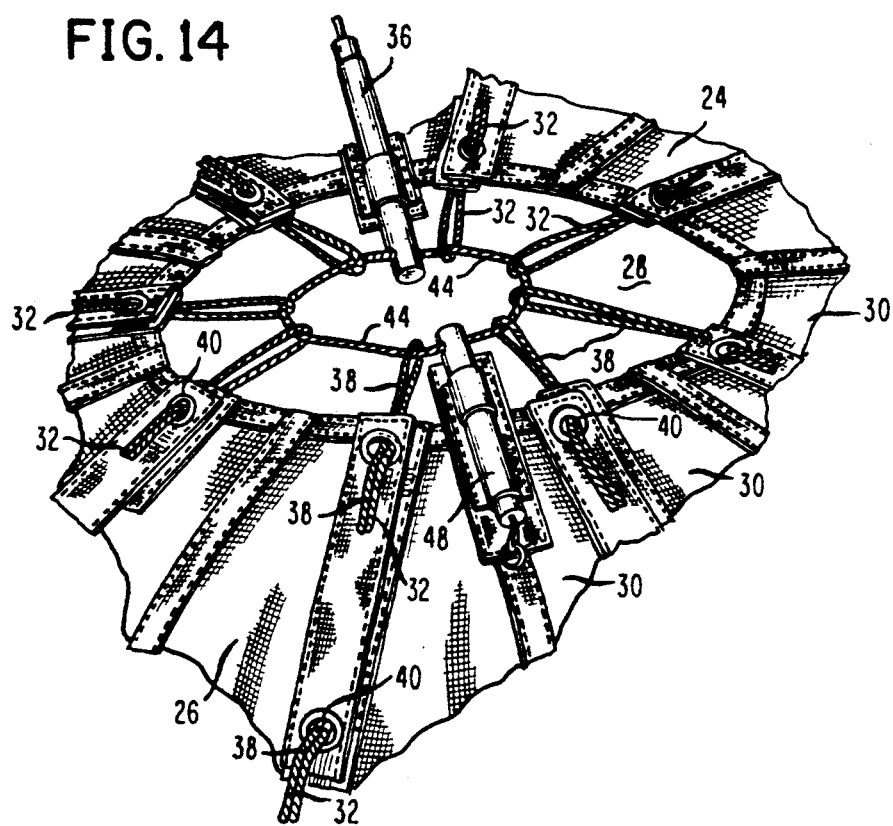
FIG. 14 is a close-up illustration of the inlet control area of the embodiment shown in FIG. 12.

As seen best in FIGS. 14 or 15 in the two alternative embodiments the line cutting means 48 when operated will cut gore release line 44. In the configuration shown in FIG. 15 this will initiate unraveling of the lacing loops 42 downwardly along the seam between each adjacent pair of inlet control gore panels 30. The unraveling will extend downwardly in a rather rapid fashion to the main skirt 16 and the entire integrity of the inlet control parachute 24 and of the interconnected inlet control gore panels 30 thereof will be gone. As such the individual gore panels 30 of the inlet control canopy 26 will be distributed about the inner lower skirt area of the main skirt 16 as best shown in FIGS. 9, 10 and 11. This disreefing or dismembering of the inlet control parachute 24 will be achieved extremely quickly after firing of the line cutting means 48.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A large parachute with means to positively expand the inlet area to facilitate deployment thereof which comprises:

A. a main parachute means including:
     (1) a main canopy means further including:
       a. a plurality of main gore panels joined together to form said main canopy means;
       b. a main skirt means defined along the lower portion of said main canopy means, said main skirt means defining a main inlet area adapted to receive incoming air to aid in deployment of said main parachute means;

(2) a main reefing attachment means attached to said main skirt means of said main parachute means to facilitate reefing thereof;

(3) a plurality of main suspension line means attached with respect to said main skirt means of said main canopy means;

B. an inlet control reefing means attachable with respect to said main reefing attachment means to control deployment of said main canopy means;

C. an inlet control parachute means for positively expanding said inlet area of said main parachute to facilitate deployment thereof, said inlet control parachute means including:

(1) an inlet control canopy means defining an upper vent means therein, said inlet control canopy means further including:

a. a plurality of inlet control gore panels detachably joined together to form said inlet control canopy means and to define said upper vent means therein;

b. a gore panel attachment means positioned adjacent said inlet control gore panels to detachably attach each of said inlet control gore panels with respect to another of said inlet control gore panels positioned thereadjacent to form said inlet control canopy means;

c. an inlet control skirt means defined along the lower portion of said inlet control canopy means, said inlet control skirt means being selectively attachable with respect to said inlet control reefing means to facilitate control of deployment of said main parachute means; and D. a gore panel release means operatively attached with respect to said gore panel attachment means, said gore panel release means being operative responsive to activation thereof to release said inlet control reefing means and to release said inlet control gore panels from attachment with respect to one another for dismembering of said inlet control canopy means and allowing full deployment of said main parachute means.

2. A large parachute with means to positively expand the inlet area to facilitate deployment thereof as defined in claim 1 wherein said gore panel attachment means comprises gore panel line means extending vertically along adjacent pairs of said inlet control gore panels to facilitate detachable attachment therebetween.

3. A large parachute with means to positively expand the inlet area to facilitate deployment thereof as defined in claim 2 wherein said inlet control gore panels include grommet means attached thereto and adapted to receive said gore panel line means extending therethrough to facilitate detachable attachment of adjacent pairs of said inlet control panels with respect to one another.

4. A large parachute with means to positively expand the inlet area to facilitate deployment thereof as defined in claim 2 wherein each of said inlet control gore panels includes a plurality of lacing loops secured thereto and being engageable with respect to adjacent lacing loops to facilitate interconnection between adjacently positioned inlet control gore panels.

5. A large parachute with means to positively expand the inlet area to facilitate deployment thereof as defined in claim 2 further comprising a gore release line attached with respect to said gore panel line means within said upper vent means and operative responsive to cutting thereof to release said gore panel line means and allow detachment of said gore panel lines from attachment with respect to one another for dismembering of said inlet control canopy means.

6. A large parachute with means to positively expand the inlet area to facilitate deployment thereof as defined in claim 5 wherein said gore release line is a circular loop.

7. A large parachute with means to positively expand the inlet area to facilitate deployment thereof as defined in claim 5 wherein said gore release line is positioned within said upper vent means.

8. A large parachute with means to positively expand the inlet area to facilitate deployment thereof as defined in claim 1 wherein said gore panel release means comprises a line cutting means.

9. A large parachute with means to positively expand the inlet area to facilitate deployment thereof as defined in claim 1 wherein said upper vent means is located at the apex of said inlet control canopy means.

10. A large parachute with means to positively expand the inlet area to facilitate deployment thereof as defined in claim 1 wherein said main reefing attachment means comprises a plurality of main reefing ring means.

11. A large parachute with means to positively expand the inlet area to facilitate deployment thereof as defined in claim 1 further including a supplementary inlet control reefing means to provide a supplementary initial stage of deployment of said inlet control canopy means smaller than full deployment thereof.

12. A large parachute with means to positively expand the inlet area to facilitate deployment thereof as defined in claim 11 further comprising inlet control reefing rings attached with respect to said inlet control gore panels and wherein said supplementary inlet control reefing means includes a supplementary inlet control reefing line attachable with respect to said inlet control reefing rings to restrict initial deployment of said inlet control canopy means.

13. A large parachute with means to positively expand the inlet area to facilitate deployment thereof as defined in claim 12 further comprising a supplementary line cutting means operatively engaged with respect to said supplementary inlet control reefing line for cutting thereof to allow full deployment of said inlet control parachute means.

14. A large parachute with means to positively expand the inlet area to facilitate deployment thereof as defined in claim 1 wherein a plurality of main gore panels are attached with respect to each one of said inlet control gore panels prior to release of said inlet control reefing means.

15. A large parachute with means to positively expand the inlet area to facilitate deployment thereof as defined in claim 1 wherein said inlet control gore panels extend vertically from said inlet control skirt means to said upper vent means.

16. A large parachute with means to positively expand the inlet area to facilitate deployment thereof as defined in claim 1 wherein said inlet control parachute means is operative to form said main inlet area of said main canopy means into a generally circular shape prior to full deployment thereof.

17. A large parachute with means to positively expand the inlet area to facilitate deployment thereof as defined in claim 1 wherein at least one of said main suspension line means are of Kevlar material.

18. A large parachute with means to positively expand the inlet area to facilitate deployment thereof as defined in claim 1 wherein the porosity of the material of said inlet control gore panels is between five (5) and ten (10) cubic feet of air per square foot of material per minute.

19. A large parachute with means to positively expand the inlet area to facilitate deployment thereof as defined in claim 1 wherein the porosity of the material of said main gore panels is between eighty (80) and one hundred twenty (120) cubic feet of air per square foot of material per minute.

20. A large parachute with means to positively expand the inlet area to facilitate deployment thereof which comprises:
 A. a main parachute means including:
  (1) a main canopy means further including:
   a. a plurality of main gore panels joined together to form said main canopy means, said main gore panels being of a material having a porosity of between eighty (80) and one hundred twenty (120) cubic feet of air per square foot of material per minute;
   b. a main skirt means defined along the lower portion of said main canopy means, said main skirt means defining a main inlet area adapted to receive incoming air to aid in deployment of said main parachute means;
  (2) a main reefing attachment means comprising a plurality of main reefing ring means attached to said main skirt means of said main parachute means to facilitate reefing thereof;
  (3) a plurality of main suspension line means attached with respect to said main skirt means of said main canopy means, at least one of said main suspension lines being made of Kevlar material;
 B. an inlet control reefing means attachable with respect to said main reefing attachment means to control deployment of said main canopy means;
 C. an inlet control parachute means for positively expanding and approximately circularizing of said inlet area of said main parachute to facilitate full deployment thereof, said inlet control parachute means including:
  (1) an inlet control canopy means defining an upper vent means therein, said inlet control canopy means further including:
   a. a plurality of inlet control gore panels extending vertically and being detachably joined together to form said inlet control canopy means and to define said upper vent means therein, said upper vent means being located at the apex of said inlet control canopy means, each of said inlet control gore panels including a lacing loop means to facilitate detachable attachment therebetween, said inlet control gore panels being of a material having a porosity of between five (5) and ten (10) cubic feet of air per square foot of material per minute;
   b. a gore panel attachment means including a gore panel line means positioned adjacent said inlet control gore panels and attached with respect to said lacing loop means to detachably attach each of said inlet control gore panels with respect to another of said inlet control gore panels positioned thereadjacent to form said inlet control canopy means;
   c. an inlet control skirt means defined along the lower portion of said inlet control canopy means, said inlet control skirt means being selectively attachable with respect to said inlet control reefing means to facilitate control of deployment of said main parachute means; and
 D. a gore panel release means operatively attached with respect to said gore panel attachment means, said gore panel release means including a line cutting means operatively attached to said gore panel line means for cutting thereof responsive to activation of said cutting means, said line cutting means being operative responsive to activation thereof to release said inlet control reefing means and to release said inlet control gore panels from attachment with respect to one another for dismembering of said inlet control canopy means and allowing full deployment of said main parachute means.

* * * * *